US009434075B2

(12) United States Patent
Doll et al.

(10) Patent No.: US 9,434,075 B2
(45) Date of Patent: Sep. 6, 2016

(54) METHOD FOR OPERATING A MULTI-LIMB MANIPULATOR

(71) Applicant: FESTO AG & Co. KG, Esslingen (DE)

(72) Inventors: Matthias Doll, Esslingen (DE); Armin Hartmann, Ostfildern (DE); Rudiger Neumann, Ostfildern (DE)

(73) Assignee: FESTO AG & CO. KG, Esslingen (DE)

( * ) Notice: Subject to any disclaimer, the term of this patent is extended or adjusted under 35 U.S.C. 154(b) by 78 days.

(21) Appl. No.: 14/494,836

(22) Filed: Sep. 24, 2014

(65) Prior Publication Data

US 2015/0088309 A1    Mar. 26, 2015

(30) Foreign Application Priority Data

Sep. 25, 2013  (DE) .................. 10 2013 016 019

(51) Int. Cl.
*G06F 19/00* (2011.01)
*B25J 9/16* (2006.01)
*G05B 13/04* (2006.01)

(52) U.S. Cl.
CPC .............. *B25J 9/1682* (2013.01); *B25J 9/163* (2013.01); *G05B 13/04* (2013.01); *G05B 2219/42062* (2013.01); *Y10S 901/02* (2013.01); *Y10S 901/15* (2013.01); *Y10S 901/28* (2013.01)

(58) Field of Classification Search
USPC ................. 701/245; 318/560, 568, 572, 573, 318/568.1, 568.13, 568.11, 568.17, 568.18, 318/568.22, 567; 700/245; 901/27, 28, 29, 901/20, 23, 14, 25
See application file for complete search history.

(56) References Cited

U.S. PATENT DOCUMENTS

| 5,719,482 A | 2/1998 | Kunzel | |
|---|---|---|---|
| 6,429,617 B1 * | 8/2002 | Sano | B25J 9/1666 318/560 |
| 7,102,311 B2 * | 9/2006 | Nishimura | B25J 9/1651 318/280 |
| 7,443,124 B2 * | 10/2008 | Bischoff | B25J 9/1674 318/568.17 |
| 7,774,099 B2 * | 8/2010 | Kobayashi | B25J 9/1671 318/560 |
| 8,423,189 B2 * | 4/2013 | Nakanishi | B25J 9/1676 700/255 |
| 2004/0210426 A1 * | 10/2004 | Wood | G06F 17/5009 703/2 |
| 2006/0071625 A1 * | 4/2006 | Nakata | B25J 9/1633 318/568.12 |

(Continued)

FOREIGN PATENT DOCUMENTS

DE         102005037189         2/2007

*Primary Examiner* — Ronnie Mancho
(74) *Attorney, Agent, or Firm* — Hoffmann & Baron, LLP

(57) ABSTRACT

A method for operating a multi-limb manipulator which includes electric actuators assigned to manipulator limbs, control units assigned to the actuators, including: the provision of desired movement values for the actuator to an actuator dynamic model and the determination of an electric desired current value for the actuator, the transfer of the desired current value to a controller designed for outputting an actuator current to the actuator with the inclusion of the desired current value and of a measured actual current value and a measured actual position of the actuator, wherein a difference between the desired current value and the actual current value is determined as a required positional deviation, and wherein the positional deviation is added to the desired distance fed into the actuator dynamic model to facilitate a diversion movement of the manipulator limb operated by the actuator on the occurrence of an external disturbing force.

9 Claims, 2 Drawing Sheets

(56) References Cited

U.S. PATENT DOCUMENTS

| | | | |
|---|---|---|---|
| 2009/0024142 A1* | 1/2009 | Ruiz Morales | A61B 19/2203 606/130 |
| 2010/0234999 A1* | 9/2010 | Nakajima | B25J 9/1628 700/261 |
| 2011/0313568 A1* | 12/2011 | Blackwell | B25J 5/007 700/245 |
| 2012/0245733 A1 | 9/2012 | Bjorn | |
| 2014/0039517 A1* | 2/2014 | Bowling | A61B 19/2203 606/130 |
| 2014/0358284 A1* | 12/2014 | Laurent | B25J 9/161 700/264 |

* cited by examiner

METHOD FOR OPERATING A MULTI-LIMB MANIPULATOR

BACKGROUND OF THE INVENTION

The invention relates to a method for operating a multi-limb manipulator which comprises at least one electric actuator for introducing a relative movement into adjacent manipulator limbs, a control unit for a controlled energy supply to the actuator being assigned to the at least one actuator.

A manipulator which can be controlled by means of the method may for example be designed for handling workpieces or for machining workpieces. Methods for operating multi-limb manipulators are usually designed for handling and/or machining dimensionally stable workpieces, so that, in programming the method for defining the movements of the manipulator, the geometry of the workpiece can be assumed to be constant and is included as a fixed component in the programming process. In contrast to this, when programming a method for defining movements of a manipulator designed for handling and/or machining elastic workpieces which are not dimensionally stable, the variable geometry of the workpiece has to be taken into account, which makes the use of the manipulator for such purposes considerably more difficult. This applies in particular if the actuators of the manipulator do not have any intrinsic elasticity or flexibility, which is known of pneumatic systems in particular. For example, if electric drives are used as actuators for the manipulator, these have a high mechanical rigidity which can cause considerable problems in the handling or machining of elastic workpieces which are not dimensionally stable. According to prior art not published in print, attempts have been made to reduce the mechanical rigidity of the electric drives by means of elastic links and/or measures of control technology. For this, the actuators assigned to the manipulator and determining its spatial position have to be equipped with complex sensor technology, for example with force transducers and/or speed sensors, and controlled by a central unit.

SUMMARY OF THE INVENTION

The invention is based on the problem of specifying a method for operating a multi-limb manipulator, wherein the mechanical rigidity of the electric actuators can be reduced without complex sensor technology by using an advantageous closed-loop control to such a degree that an almost "pneumatic behaviour" of the manipulator can be obtained combined with a high positioning accuracy.

For a method of the type referred to above, this problem is solved by the steps listed in claim 1 and reproduced below: the provision of desired movement values from the group: desired distance and desired velocity or desired distance and desired acceleration or desired distance and desired velocity and desired acceleration for the actuator to an actuator dynamic model and the determination of an electric desired current value for the actuator in the actuator dynamic model in order to obtain the preset desired movement values, the transfer of the desired current value or the desired current value and the desired movement values to a controller designed for outputting an actuator current to the actuator with the inclusion of the desired current value and of a measured actual current value and a measured actual position of the actuator, wherein a difference between the desired current value and the actual current value is determined and converted into a required positional deviation of the actuator, and wherein the determined required positional deviation is added to the desired distance fed into the actuator dynamic model in order to facilitate a diversion movement of the gripper coordinated for at least one actuator on the occurrence of an external disturbing force. In the illustrated example, the controller is a cascade controller or a state controller.

The desired movement values are made available by a path generator which, knowing the current actual position of the actuator, determines the movements of the at least one actuator, which at least contributes to the determination of the spatial position of the multi-limb manipulator, which movements are required for completing the current movement function. The desired movement values are made available by the path generator to the actuator dynamic model, which may, for example, be an electric circuit or a software module which can, for each spatial position of the multi-limb manipulator, calculate the force which the at least one electric actuator has to provide in order to initiate the desired relative movement between the adjacent manipulator limbs coupled to the actuator. In the actuator dynamic model, the number, the geometries and the kinematic couplings of the manipulator limbs in particular as well as the technical properties of the electric actuators are mapped. The actuator dynamic model is in particular based on a simulation which takes into account the marginal conditions referred to above and which is able to provide for each spatial position or configuration of the manipulator both a value for a holding force of the respective actuator and a value for a positive or negative acceleration of the manipulator limbs connected to the actuator from a table of values and/or by using algorithms. The actuator dynamic model can further be given the task of converting the force determined in this way into a desired current value for the respective actuator and of transferring this desired current value to the controller. In this case, the controller is designed to regulate the current for the associated actuator, using the desired current value provided by the actuator dynamic model and including a currently flowing actual current value and a measured actual position of the actuator, in order to facilitate within a presettable time window a matching of the actual current value to the desired current value, thereby initiating the desired movement of the actuator.

In order to ensure the desired elastic or flexible behaviour while external forces act on the manipulator, it is further provided that a difference between the desired current value and the actual current value is determined and this difference is converted into a so-called required positional deviation of the actuator relative to the desired position preset by the path generator. The required positional deviation is in this case dimensioned such that the manipulator segments coupled to the actuator and the actuator exhibit, irrespective of their great rigidity, in practical applications the desired elastic or flexible behaviour, in order, for example, to eliminate damage to the workpiece to be handled either completely or at least to a great extent. For this purpose, the determined required positional deviation is, in particular by means of an addition process or a subtraction process, calculated together with the desired distance made available to the actuator dynamic model by the path generator, so that during the next control cycle the actuator is caused to perform a diversion movement which is related in a presettable way to the occurrence of the external disturbing force. By way of example, it may be provided that the actuator has different elastic properties adjustable by means of the actuator dynamic model for different operating states and/or spatial positions of the manipulator, whereby an additional degree of freedom can be provided for the movement of the manipulator when compared to a manipulator with pneumatic actuators. It may for example be provided that the manipulator has an elasticity in a first spatial position which differs from that in a second spatial position.

Advantageous further developments of the invention are specified in the dependent claims.

It is expedient if the actuator dynamic model is designed to take into account interactions between several, in particular all, electric actuators determining the spatial position of the manipulator, and if for each of the electric actuators individual desired movement values are made available from the group: desired distance and desired velocity or desired distance and desired acceleration or desired distance and desired velocity and desired acceleration, and if for each of the actuators taken into account an individual desired current value is calculated and transferred to an individual controller in order to determine there an individual actuator current with the inclusion of a measured actual current value and a measured actual position of the respective actuator, wherein a difference between the desired current value and the actual current value of the respective actuator is converted into a positional deviation of that actuator, which is added to the desired distance in order to facilitate a diversion movement of the actuator on the occurrence of an external disturbing force. It may optionally be provided that an individual actuator dynamic model is provided for each actuator, or that the individual desired current values are calculated sequentially or in parallel in a common actuator dynamic model.

In an advantageous further development of the method, it is provided that the actual current value is determined in the control unit which is connected to the controller or contains the controller and which is designed to provide the electric energy to the electric actuator as a function of the desired current value. This eliminates the need for an additional force or torque sensor which may, for example, be located directly on the actuator. The control unit preferably comprises a motor controller which is designed to convert a current signal provided by the controller into a current which is actually to be provided to the actuator, and which comprises, for the purpose of a current control using the current value preset by the controller, an internal current transducer, in particular a measurement resistor electrically connected in parallel with the actuator, where a voltage which is dependent on the current through the actuator and which can be determined using a suitable voltage measuring device drops, or a suitably connected Hall sensor.

In a further variant of the method, it is provided that a desired current value for a holding force or for a movement of the respective actuator is determined for each spatial position of the manipulator and for each actuator position of each actuator, using the actuator dynamic model and the individual desired movement values for the respective actuator, and that this is transferred to the controller. In the actuator dynamic model, all spatial positions of the individual manipulator limbs, which were in particular determined in a preceding simulation and possibly verified by following movements of the manipulator, and the associated values for the holding force of each actuator in the spatial position and for the acceleration of the actuator from this spatial position are stored. Using the actuator dynamic model starting from a known position, and knowing the movement task provided by a higher-order control unit or by the path generator, processed by the path generator and divided into the movements of the individual actuators, a desired current value can be determined for each actuator and transferred to the controller. By including further marginal conditions, such as a variable weight of a tool to be moved by the manipulator, the positioning accuracy of the manipulator is increased further.

It is advantageous if the spatial position and the actuator position of all electric actuators mounted on the manipulator and interacting with one another are taken into account when determining the desired current value for the respective actuator. Basically, it is provided that the same actuator dynamic models and controllers are implemented in all control units, because in this way the costs of the hardware and possibly the software involved can be kept low. This applies in particular if the manipulator is potentially dangerous to the workpiece and/or a user or operator, because in this case the manipulator functions have to be certified for aspects of safety technology. If the same electronics are implemented in each control unit and if the same computer programme, in particular including the actuator dynamic model and the controller, runs in each control unit the required certification can be kept simple. If the manipulator comprises a plurality of actuators which determine the spatial position of the manipulator segments, it may be advantageous to provide the various actuators with two or more differently equipped control units, with the actuator dynamic models implemented in the various control units possibly taking into account only a part of the actuators in determining the respective movement values, in particular only the adjacent actuators.

It is preferably provided that the difference determined between the desired current value and the actual current value is converted into the positional deviation of the respective actuator only if the determined difference exceeds a presettable threshold value. This avoids undesirable vibrations of the manipulator which would otherwise occur if even minimal differences between the desired and the actual current value were taken into account. In this context, it may be provided that the threshold value is varied as a function of the spatial position of the manipulator and/or of an operating state for the manipulator.

In a further development if the invention, it is provided that the difference determined between the desired current value and the actual current value is converted into the positional deviation of the respective actuator in a filter stage which is in particular designed as a damped spring-mass oscillator and which smoothes and/or damps the progression in time of the determined difference. This measure likewise prevents undesirable vibrations of the manipulator, wherein it may further be provided that the smoothing and/or damping action is varied as a function of the spatial position of the manipulator and/or of an operating state for the manipulator.

It is expedient if several, in particular all, actuators are assigned a control unit each, in which the desired current value for the respective actuator is determined by means of the actuator dynamic model designed to take into account the interactions of several, in particular all, electric actuators mounted on the manipulator, using the measured actual current value and the measured actual position of the respective actuator. By this decentralised arrangement of the control units, the signal propagation times which may be involved in the transmission of actual positions and actual current values to a central control unit can be avoided at least to a large extent. This ensures a particularly fast reaction of the actuators to external disturbing forces.

In an alternative embodiment of the invention, it is provided that several, in particular all, actuators are assigned a control unit each, in which the desired current value for the respective actuator is determined by means of the actuator dynamic model designed to take into account the interactions of several, in particular all, electric actuators mounted on the manipulator, including all measured actual currents and all measured actual positions of the electric actuators mounted on the manipulator. This facilitates a particularly precise control of the individual actuators, because all data known from the other actuators are included in the actuator dynamic model and taken into account in the calculation of each individual desired current value.

It is particularly advantageous if desired currents for an actuator, which were determined by various control units for a given movement situation of the actuators determining the spatial position of the manipulator, are compared. In this way, the control units can be monitored, for example in order to effect a shutdown of the manipulator or at least the output of an error message if there is a difference between two desired currents determined by different control units, in order to inform a user of a potential malfunction of at least one of the control units.

BRIEF DESCRIPTION OF THE DRAWINGS

The method according to the invention is explained with reference to the drawing, of which.

DETAILED DESCRIPTION

Figure 1:
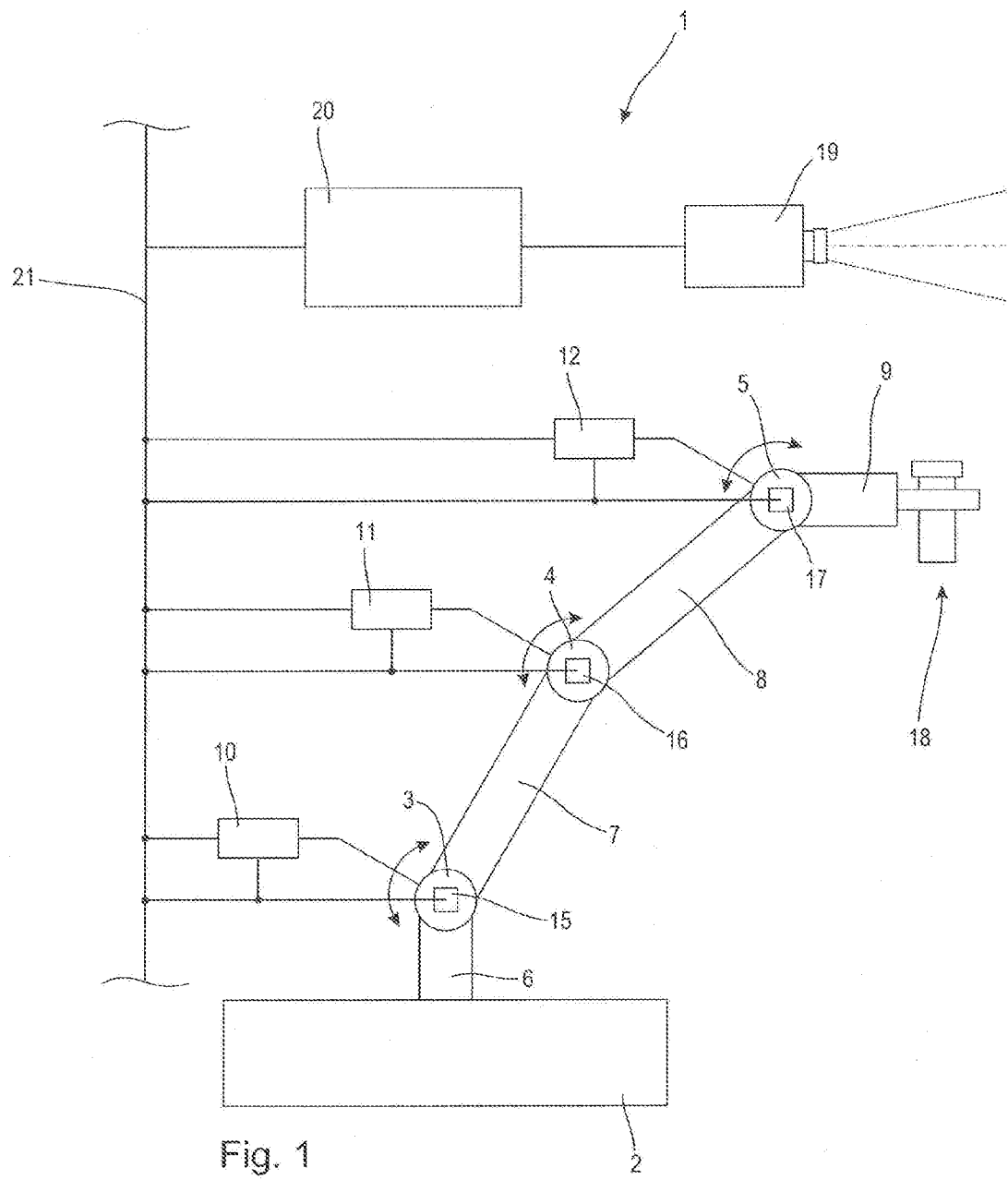
FIG. 1 is a diagrammatic representation of a multi-limb manipulator with several actuators and associated control units.

A multi-limb manipulator 1 shown in FIG. 1 is mounted in a fixed location on a foundation 2 and comprises three electric actuators 3, 4 and 5 designed as rotary actuators. Each of the electric actuators 3, 4 and 5 forms a swivel joint between manipulator limbs 6, 7, 8 and 9 and facilitates a rotational relative movement of adjacent manipulator limbs 6 and 7, 7 and 8, 8 and 9 in the drawing plane of FIG. 1. In the illustrated embodiment, the electric actuators 3, 4 and 5 are designed as geared motors not shown in detail and are supplied with electric energy from an energy source not shown in the drawing by associated control units 10, 11 and 12. Each of the electric actuators 3, 4 and 5 is assigned a sensor 15, 16 and 17 for detecting a relative angular position of the manipulator limbs 6 and 7, 7 and 8, 8 and 9, which are pivotably connected to one another. This sensor 15, 16 and 17 may for example be a rotary angle sensor. At the free end of the manipulator 1 of the illustrated embodiment and therefore at the manipulator limb 9, a gripper 18 designed for gripping an object not shown in detail is mounted, by means of which gripper such containers can, for example, be conveyed automatically between a pickup position not shown in the drawing and an offloading position likewise not shown in the drawing.

In order to ensure a correct positioning of the gripper 18 in the pickup position not shown in the drawing, a camera 19 can be provided, which is configured such that it can optically detect both the gripper 18 and the pickup position or the offloading position for the object. By means of an image processing system formed in the path generator 20, a determination of the distance between the gripper 18 and the object from the image recorded by the camera 18 is made possible. From this determination of distance, which may for example be made available in vector notation, the path generator 20 calculates the movement path of the gripper 18, for example in order to move the gripper 18 from a neutral position into a gripping position or from the gripping position into the neutral position. For this purpose, the path generator 20 divides the movement path for each of the actuators 3, 4 and 5 into individual desired movement values, such as desired distance, desired velocity and desired acceleration.

Figure 2:
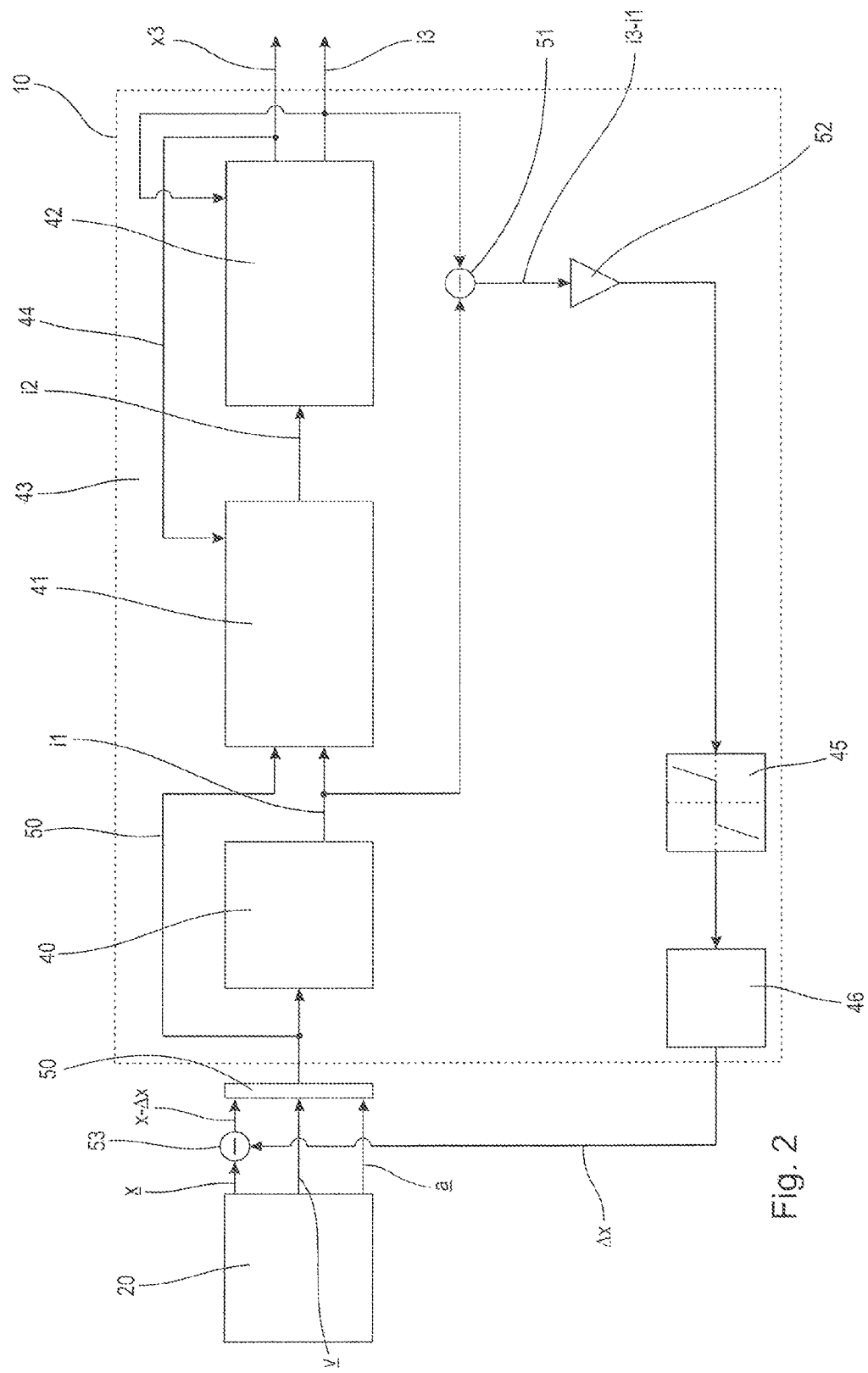
FIG. 2 is a flow diagram of the method according to the invention.

These desired movement values are then output by the path generator 20 via a bus system 21, via which the path generator 20 is electrically connected to the control units 10, 11 and 12 and to the sensors 15, 16 and 17, as shown in FIG. 2. The bus system 21 facilitates a preferably bidirectional data transmission between the path generator and the control units 10, 11 and 12 and an optional unidirectional or bidirectional data transmission between the sensors 15, 16 and 17 and the path generator 20. It is further provided that data are transmitted directly via the bus system 21 between the sensors 15, 16 and 17 and the associated control units 10, 11 and 12 of the respective electric actuators 3, 4 and 5, in order to facilitate a direct feedback between a detected position of the respective actuator 3, 4 and 5 and the associated control unit 10, 11 and 12. As an alternative to the illustrated bus system, individual wiring of the components may be provided.

The control units 10, 11 and 12 are preferably constructed identically and have a mode of operation as illustrated diagrammatically in FIG. 2. In the illustrated embodiment, they are equipped with identical computer programmes for this purpose, which comprise the actuator dynamic model and the controller in particular.

In the illustrated embodiment, it is provided that the path generator 20 makes available to the actuator dynamic model 40 the movement values: desired distance x, desired velocity v and desired acceleration a as group of values 50. The actuator dynamic model 40 is based on a simulation in which, for each position of the manipulator 1 and for each of the actuators 3, 4 and 5, driving forces or torques and resulting desired electric currents for holding the manipulator 1 in its respective position or for moving the manipulator 1 with presettable accelerations in different spatial directions, possibly with the inclusion of the movements of further or all actuators 3, 4 and 5, from the respective spatial position of the manipulator 1 are stored. The actuator dynamic model 40 is therefore configured to determine, for the associated actuator 3, 4 or 5 or as a function of the group of values 50, in particular the acceleration(s), preset for the respective actuator(s) 3, 4 and 5 by the path generator 20, a desired electric current i1 as a desired current value, which is transferred to the controller 41 in a subsequent step. In the illustrated embodiment, it is further provided that the group of values 50, in particular the movement values: desired distance x, desired velocity v and desired acceleration a, are directly made available by the path generator 20 to the controller 41. This information enables the controller 41 to control the movements of each of the actuators 3, 4 or 5 as demanded by the path generator 20, while taking into account the current flowing through the respective actuator 3, 4 or 5, in such a way that this movement corresponds to the demanded movement with as little delay as possible. For this purpose, it is provided that the controller 41 provides a current demand i2 to the drive 42, which may comprise a motor controller and the associated actuators 3, 4 or 5. In the drive 42, this current demand i2 is converted into an actual current flow i3, which has to be made available to the associated actuator 3, 4 or 5. In the illustrated embodiment, the actual current flow i3 or the actual current value in the respective actuator 3, 4 or 5 is also determined by means of a current meter which is not shown in detail and into which a current flow sensor is integrated, so that there is no need for an additional sensor for current flow.

The actual current flow i3 is fed back to the drive 42 via the measuring line 43. In addition, the spatial position or actual position x3 of adjacent manipulator limbs 6, 7, 8, 9, which are movably connected to one another, as determined by the associated sensor 15, 16 or 17 is transmitted to the controller 41 via the measuring line 43.

Moreover, on the basis of the actual current value i3 and the desired current value i1 calculated by the actuator dynamic model 40, a mathematical operation is performed in a calculating module 51, by means of which conclusions can be drawn about a disturbing force acting on the manipulator 1. In the illustrated embodiment, the mathematical operation is the subtraction between the actual current value i3 and the desired current value i1. The fundamental consideration is based on the fact that the actual current value i3 reflects the actual situation at the respective actuator 3, 4 or 5, for example precisely corresponding to the desired current value i1 in the absence of a disturbing force. In the presence of a disturbing force, the control processes of the control loop formed by the controller 41, the drive 42 and the associated actuator 3, 4 or 5 cause a deviation from the desired current value i1, which represents the disturbing force.

In the illustrated embodiment, the result of the mathematical operation is fed to a threshold value filter 45 which is provided to filter out minor vibrations of the manipulator 1 or individual actuators 3, 4 or 5 in order to avoid an undesirable vibrating of the manipulator 1. If a result of the mathematical operation is more than a threshold value stored in the threshold value filter 45, the result of the mathematical operation is fed to a converter module 46. In the illustrated embodiment, a mathematical transfer function, in particular a PT2 term, is implemented in the converter module 46. With the aid of this transfer function, the result of the mathematical operation is, for example, converted into a positional deviation Δx. Following this, it is provided that the detected positional deviation Δx is mathematically coupled to the desired distance x determined by the path generator 20, for example by means of differentiation. This facilitates a feedback of the disturbing force coupled into the manipulator 1 into the control loop formed by the controller 41, the drive 42 and the associated actuator 3, 4 or 5.

Accordingly, the result is a modification of the desired distance x as a function of the disturbing force acting on the manipulator 1, and this modification is fed into the control loop in such a way that the manipulator 1 can, in a flexible or elastic way in the manner of a manipulator equipped with pneumatic actuators, give way without requiring elastic or flexible intermediate links between the substantially rigid electric actuators 3, 4 and 5 and the associated manipulator limbs 6, 7, 8 and 9 which would affect the positioning accuracy of the manipulator 1. This is particularly important if the manipulator 1 is to be used in applications in which flexible workpieces have to be moved, for example, or in which there may be unpredictable reactions to movements of the manipulator 1.

In addition, it may be provided that a velocity deviation which can be mathematically linked to the movement value "desired velocity" determined by the path generator 20 is determined by means of a further converter module not shown in the drawing, in which a mathematical transfer function is implemented as well, for example by subtraction, in order to improve a feedback of the disturbing force coupled into the manipulator 1 into the control loop formed by the actuator dynamic model 40, the controller 41, the drive 42 and the associated actuator 3, 4 or 5.

In an embodiment not illustrated in the drawing, the actuators are connected to a central control unit designed for a central provision of the desired currents for all of the actuators. Such a central control unit offers the advantage that the movements of the individual actuators can be coordinated in a particularly simple way. In contrast, in a distributed arrangement of the actuators, in particular in a manipulator with a plurality of limbs, it is advantageous to assign control units to the respective actuators or possibly to groups of actuators. This can ensure a particularly fast reaction of the respective actuator to the occurrence of disturbing forces, wherein the respective control units are optionally supplied with the sensor data, in particular position and current flow values, of all actuators or only with the sensor data of the respective associated actuator or group of actuators.

The invention claimed is:

1. A method for operating a multi-limb manipulator which comprises at least one electric actuator for introducing a relative movement into adjacent manipulator limbs, and a control unit comprising a controller for a controlled energy supply to the at least one electric actuator, the method comprising the steps of:
   providing desired movement values for the at least one electric actuator to an actuator dynamic model, the desired movement values including a desired distance and at least one of a desired velocity and a desired acceleration for the at least one electric actuator;
   determining an electric desired current value in the actuator dynamic model, the electric desired current value being an amount of current necessary for the at least one electric actuator in order to obtain the desired movement values for the at least one electric actuator;
   transferring the electric desired current value or the electric desired current value and the desired movement values to the controller of the control unit;
   determining an actuator current demand in the controller, the determined actuator current demand being based on the electric desired current value and on a measured actual current value and on a measured actual position of the at least one electric actuator;
   outputting the actuator current demand from the controller to the at least one electric actuator;
   determining a difference between the electric desired current value and the measured actual current value;
   converting the determined difference between the electric desired current value and the measured actual current value into a required positional deviation of the at least one electric actuator; and
   adding the required positional deviation to the desired distance provided to the actuator dynamic model in order to facilitate a diversion movement of the at least one manipulator limb operated by the at least one electric actuator on an occurrence of an external disturbing force.

2. The method according to claim 1, wherein the multi-limb manipulator comprises a plurality of the electric actuators and the actuator dynamic model is designed to take into account interactions between all of the electric actuators for determining the spatial position of the manipulator, and wherein, for each of the electric actuators, individual desired movement values are made available including a desired distance and at least one of desired velocity and a desired acceleration, and wherein, for each of the electric actuators, an individual desired current value is calculated and transferred to an individual controller in order to determine an individual actuator current with the inclusion of a measured actual current value and a measured actual position of the respective actuator, wherein a difference between the desired current value and the actual current value of the respective actuator is converted into a positional deviation of that actuator, which is added to the desired distance in order to facilitate a diversion movement of the actuator on the occurrence of an external disturbing force.

3. The method according to claim 1, wherein the electric a desired current value is determined for a holding force or for a movement of the at least one electric actuator for each spatial position of the manipulator and for each actuator position, using the actuator dynamic model and the individual desired movement values for the actuator.

4. The method according to claim 2, wherein a spatial position and an actuator position of all of the plurality of electric actuators interacting with one another are taken into account when determining the electric desired current value for a respective actuator.

5. The method according to claim 1, wherein the difference determined between the electric desired current value and the measured actual current value is converted into the required positional deviation of the at least one electric actuator only if the determined difference exceeds a presettable threshold value.

6. The method according to claim 1, wherein the difference determined between the electric desired current value and the measured actual current value is converted into the required positional deviation of the at least one electric actuator in a filter stage, the filter stage comprising a damped spring-mass oscillator for smoothing and damping the progression in time of the determined difference.

7. The method according to claim 2, wherein all of the plurality of electric actuators are assigned a respective control unit, each control unit determining the electric desired current value for the respective actuator, and wherein each control unit includes a respective actuator dynamic model designed to take into account the interactions of all electric actuators mounted on the manipulator, using the measured actual current value and the measured actual position of the respective actuator.

8. The method according to claim 2, wherein all of the plurality of electric actuators are assigned a respective control unit, each control unit determining the electric desired current value for the respective actuator, and wherein each control unit includes a respective actuator dynamic model designed to take into account the interactions of all, electric actuators mounted on the manipulator, including all measured actual currents and all measured actual positions of the electric actuators mounted on the manipulator.

9. The method according to claim 7, wherein the electric desired current value for each of the plurality of electric actuators is determined by a plurality of the respective control units for a given movement situation of the actuators determining the spatial position of the manipulator, and wherein the electric desired current values determined by the plurality of the respective control units are compared.

* * * * *